Feb. 8, 1949. H. D. HOOSER ET AL 2,460,826
HOLE CUTTING DEVICE
Filed April 3, 1946 2 Sheets-Sheet 2

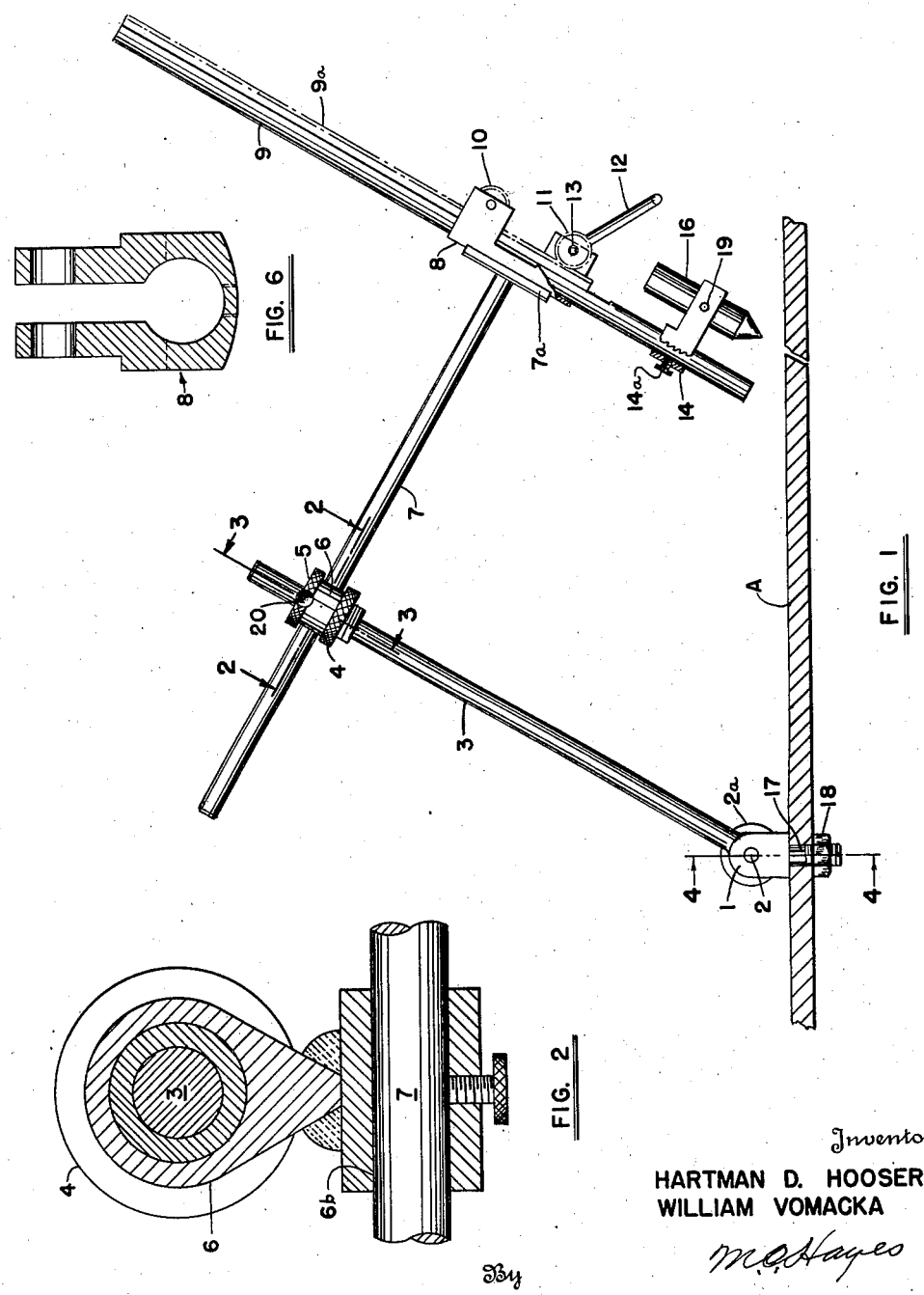

Inventor
HARTMAN D. HOOSER
WILLIAM VOMACKA

By M. Q. Hayes
Attorney

Patented Feb. 8, 1949

2,460,826

UNITED STATES PATENT OFFICE 2,460,826

HOLE CUTTING DEVICE

Hartman D. Hooser, Big Springs, Tex., and William Vomacka, United States Navy

Application April 3, 1946, Serial No. 659,418

1 Claim. (Cl. 33—30)

(Granted under the act of March 3, 1883, as amended April 30, 1928; 370 O. G. 757)

The invention relates to a tool particularly designed for cutting a hole at any angle in a curved or flat surface.

An object of the invention is to provide a tool structure of simple sturdy construction which will facilitate the heretofore tedious and difficult process of cutting out a hole in any curved or other surface at any desired angle as for the insertion of a cylindrical object such as a pipe or the like.

Another object of the invention is to provide a device which will eliminate the necessity of layout work and the necessity for trimming and grinding the cut to the desired angle as has been necessary prior to the present invention in a separate process, thereby materially reducing man hours.

A further object is the provision of such an instrument, the inherent accuracy of which guarantees a well-done job even in the hands of a novice workman.

A still further object is to provide such an instrument which will require a minimum of operations or adjustments prior to and during the use of the instrument.

Other objects and advantages will be more apparent from the following detailed description taken in connection with the accompanying drawings illustrating one embodiment of the invention, and in which:

Fig. 1 is an elevation of the device attached to a plate or the like for use.

Fig. 2 is an enlarged view partly in section substantially on the line 2—2 of Fig. 1.

Fig. 6 is a view of a detail.

Figure 3:
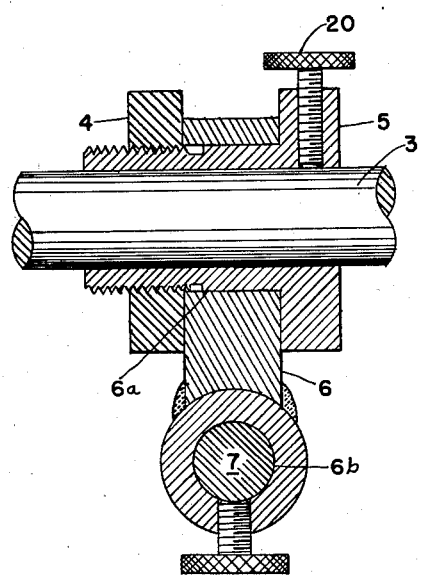
Fig. 3 is an enlarged view partly in section substantially on the line 3—3 of Fig. 1.
Figure 4:
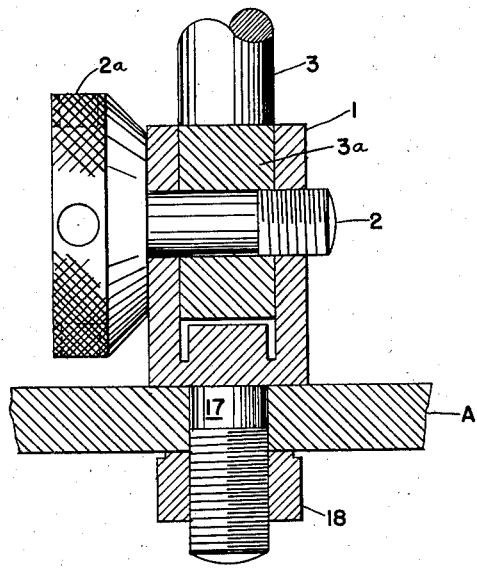
Fig. 4 is an enlarged sectional view substantially on the line 4—4 of Fig. 1.
Figure 5:
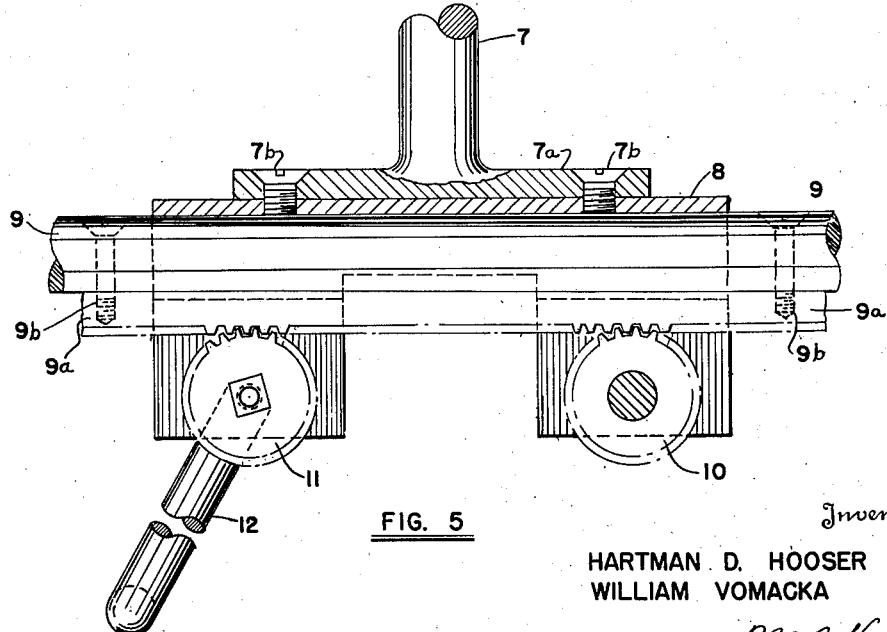
Fig. 5 is an enlarged view, partly in section, of a portion of the apparatus of Fig. 1.

Referring to the drawing, the numeral 1 represents a yoke shaped bracket member adapted to be secured to the work as represented by the plate or the like A. The yoke receives a transverse pivot pin 2 adjustably mounted by threaded engagement with the yoke for clamping an eye 3a of standard member 3 in angularly adjusted position in said yoke shaped bracket. The pin 2 has an operating disc or clamping head 2a at one end thereof. The standard member 3 at its upper end is passed through a threaded sleeve 5 which in turn is received in an opening or eye 6a of a bracket 6. The sleeve 5 has a nut 4 at its opposite end for rotatably retaining said bracket 6 on said sleeve. The sleeve 5 with its enlarged head or end and its nut 4 provides an effective rotary bearing for the bracket 6. Clamping screws 20 are provided preferably extending through the enlarged head of the sleeve 5 for clamping the sleeve 5 to the standard 3.

The bracket 6 is provided with a second eye or bore 6b extending at right angles to the first and receiving a transverse bar 7 extending at right angles to said standard member 3. A set screw or the like is provided for fixing the transverse bar in adjusted position transversely of said standard 3.

The transverse bar 7 is provided at its outer end with a foot member 7a which may desirably have a curved surface with fasteners 7b and receives and is secured by said fasteners to fork bracket 8.

Fork bracket 8 has slidably received in an opening therein, a tool carrying bar 9 disposed in parallelism with the standard member 3 for movement toward or away from the work. The tool carrying bar 9 may desirably have a rounded surface for slidable engagement in a rounded opening in the fork bracket 8. The bar 9 desirably has a flattened longitudinal surface to which is attached by screws or the like 9b, a rack member 9a. Pinion means 10 and 11 are desirably provided in the forks of the bracket 8 and in engagement with the rack 9a, the pinion means 11 desirably being provided with a crank or the like 12 for manually operating the pinion means to advance or retract the tool carrying bar 9 by means of the rack. The operating member 12 may be a crank, as shown, or may be a wheel, and may be connected with either of the pinions 10 or 11, as by means of a squared portion of the crank or the like received in a squared opening in the pinion. A retaining screw 13 may desirably be provided, threaded into the end of the crank 12.

The tool carrying bar 9 is provided at its end adjacent the work with a tool supporting bracket 14 secured thereto by means of a set screw 14a or the like, and which bracket may desirably receive an oxy-acetylene or other torch member indicated diagrammatically at 16 in the drawings, held in place by set screw means or the like 19.

In the operation of the device, the yoke bracket 1 is secured to the work by having its shank 17 extending through a hole in the work, preferably with a nut 18 on the inner end of the shank of the bracket, and providing for rotary adjustment of the direction of said yoke bracket. Primarily, but two simple operations are required in setting up the device. The desired insertion angle for the cylinder or the like must be set up by adjusting the angle of the standard member 3, as may be desired. This may be done by suitable measuring means. If desired, indicia may be provided on the yoke bracket 1 and on the eye of the standard 3 for properly setting the desired insertion angle. The second operation is to set the desired radius corresponding to the radius of the cylindrical pipe or the like to be inserted in the hole, by adjusting the bar 7 through the bore 6b of bracket 6.

Once these are set the operator has only to light the torch, and set the tip distance by means of the crank 12 and the adjustable bracket 14. The operator then proceeds to cut the hole in the work by advancing the tip at the proper rate of speed while rotating the tool about the standard 3. The operator does not have to guide the torch in any way due to the safe clamping means provided, except to maintain the proper tip distance, which is easily accomplished through the medium of the small crank and associated gearing on the mechanism.

By the present invention an effective and efficient tool is provided for cutting a rounded substantially oval or elliptical hole at any angle with respect to the surface to be cut, providing beveled surfaces for the reception of a cylindrical object inserted at the desired angle into the hole in the work.

While but one embodiment of the invention has been shown and described, it will be apparent that various modifications may be made without departing from the spirit and scope of the invention which is only to be limited by the terms of the appended claim.

The invention described herein may be manufactured and used by or for the Government of the United States of America for governmental purposes without the payment of any royalties thereon or therefor.

What is claimed is:

In a hole cutting device of the class described, a standard having an eye at one end, a yoke bracket receiving said eye with a pivot pin extending through said eye and mounted in said yoke bracket, said pivot pin having a clamping head engaging the yoke bracket for clamping the pivoted standard in angularly adjusted position, said yoke bracket having a stud portion provided with a nut and adapted to be adjustably secured to a work member such as a plate or the like for rotary adjustment of the direction of said yoke bracket, a sleeve on said standard, means for adjustably fixing said sleeve longitudinally on said standard, a rotatable bracket having an eye receiving said sleeve, said sleeve providing a bearing for rotation of said rotatable bracket thereon, said rotatable bracket having a second eye or bore at right angles to the first eye, a transverse bar slidably received in said second eye or bore and being disposed at right angles to said standard, means for fixing said transverse bar in transverse adjusted position at right angles to said standard, a fork bracket mounted at the outer end of said transverse bar, a tool-carrying bar received in said fork bracket and disposed in parallelism with said standard, said tool-carrying bar having a rack thereon, pinion means mounted in said fork bracket in engagement with said rack, and a crank for operating said pinion means to advance or retract said tool-carrying bar in respect to the plate or the like, and a tool-carrying bracket mounted at the lower end of said tool-carrying bar.

HARTMAN D. HOOSER.
WILLIAM VOMACKA.

REFERENCES CITED

The following references are of record in the file of this patent:

UNITED STATES PATENTS

| Number | Name | Date |
|--------|------|------|
| 530,822 | Caldwell | Dec. 11, 1894 |
| 1,139,298 | Keppy | May 11, 1915 |
| 1,286,770 | Rashkovsky | Dec. 3, 1918 |
| 1,907,957 | Gerber | May 9, 1933 |